(12) United States Patent
Mazany et al.

(10) Patent No.: US 6,899,837 B2
(45) Date of Patent: May 31, 2005

(54) INORGANIC MATRIX COMPOSITIONS, COMPOSITES AND PROCESS OF MAKING THE SAME

(75) Inventors: Anthony M. Mazany, Akron, OH (US); John W. Robinson, Fernandina Beach, FL (US); Craig L. Cartwright, Jacksonville, FL (US)

(73) Assignee: Goodrich Corporation, Brecksville, OH (US)

( * ) Notice: Subject to any disclaimer, the term of this patent is extended or adjusted under 35 U.S.C. 154(b) by 0 days.

(21) Appl. No.: 10/897,293

(22) Filed: Jul. 21, 2004

(65) Prior Publication Data

US 2005/0003214 A1 Jan. 6, 2005

Related U.S. Application Data

(62) Division of application No. 09/871,765, filed on Jun. 1, 2001
(60) Provisional application No. 60/233,952, filed on Sep. 20, 2000.

(51) Int. Cl.$^7$ .................................................. B28B 3/00
(52) U.S. Cl. ........................ 264/101; 264/234; 264/333; 264/621; 264/640; 264/641; 264/642
(58) Field of Search ................................ 264/101, 234, 264/333, 621, 640, 641, 642

(56) References Cited

U.S. PATENT DOCUMENTS

| | | |
|---|---|---|
| 3,933,689 A | 1/1976 | Ray et al. |
| 3,934,066 A | 1/1976 | Murch et al. |
| 3,935,018 A | 1/1976 | Ray et al. |
| 3,964,919 A | 6/1976 | Ray et al. |
| 3,989,532 A | 11/1976 | Ray et al. |
| 4,064,317 A | 12/1977 | Fukuba et al. |
| 4,159,302 A | 6/1979 | Greve et al. |
| 4,270,326 A | 6/1981 | Holter et al. |
| 4,284,664 A | 8/1981 | Rauch, Sr. |
| 4,297,252 A | 10/1981 | Caesar et al. |
| 4,299,872 A | 11/1981 | Miguel et al. |
| 4,472,199 A | 9/1984 | Davidovits |
| 4,509,559 A | 4/1985 | Cheetham et al. |
| 4,509,985 A | 4/1985 | Davidovits et al. |
| 4,675,577 A | 6/1987 | Licht |
| 4,729,916 A | 3/1988 | Feldman |
| 4,756,945 A | 7/1988 | Gibb |
| 4,767,656 A | 8/1988 | Chee et al. |
| 4,799,349 A | 1/1989 | Luckanuck et al. |
| 4,801,496 A | 1/1989 | Buchacher |
| 4,818,595 A | 4/1989 | Ellis |
| 4,879,320 A | 11/1989 | Hastings |
| 4,888,311 A | 12/1989 | Davidovits et al. |
| 4,936,064 A | 6/1990 | Gibb |
| 4,936,939 A | 6/1990 | Woolum |
| 5,053,282 A | 10/1991 | Delvaux et al. |
| 5,130,184 A | 7/1992 | Ellis |
| 5,215,806 A | 6/1993 | Bailey |
| 5,258,216 A | 11/1993 | vonBonin et al. |
| 5,288,321 A | 2/1994 | Davidovits |
| 5,352,427 A | 10/1994 | Davidovits et al. |
| 5,476,891 A | 12/1995 | Welna |
| 5,498,466 A | 3/1996 | Navarro et al. |
| 5,539,140 A | 7/1996 | Davidovits |
| 5,580,648 A | 12/1996 | Castle et al. |
| 5,722,213 A | 3/1998 | Morency |
| 5,786,095 A | 7/1998 | Batdorf |
| 5,798,307 A | 8/1998 | Davidovits et al. |
| 6,139,619 A | 10/2000 | Zaretsky et al. |
| 6,182,407 B1 | 2/2001 | Turpin et al. |
| 6,240,691 B1 | 6/2001 | Holzkaemper |
| 6,270,915 B1 | 8/2001 | Turpin et al. |
| 6,296,699 B1 | 10/2001 | Jin et al. |
| 6,340,389 B1 | 1/2002 | Klus |

FOREIGN PATENT DOCUMENTS

| | | |
|---|---|---|
| DE | 32 46 604 | 6/1984 |
| EP | 0 674 089 | 9/1995 |
| WO | WO 02/24596 | 3/2002 |
| WO | WO 02/24597 | 3/2002 |

OTHER PUBLICATIONS

Chemical Abstracts, vol. 103, No. 12, Sept. 23, 1985, abstract No. 92158d, "Strengthening of soil foundation with neutral grout" XP000064371.

Chemical Abstracts, vol. 85, No. 8, Aug. 23, 1976; abstract No. 51069s, M. Tanaka: "Nonflammable inorganic foam" XP000063264.

Chemical Abstracts, vol. 93, No. 4, Jul. 28, 1980, abstract No. 308J0w, J. Ueda et al. "Hardening and Waterproofing soft ground" XP000063866.

Chemical Abstracts, vol. 103, No. 6, Aug. 12, 1985, abstract No. 41661e, "Stabilization of weak foundations" XP000064227.

*Primary Examiner*—Paul Marcantoni
(74) *Attorney, Agent, or Firm*—Goodrich Corporation

(57) ABSTRACT

A modified alkali silicate composition for forming an inorganic network. The modified alkali silicate matrix is made by reacting an alkali silicate (or its precursors such as an alkali hydroxide, a $SiO_2$ source and water), an acidic oxoanionic compound such as phosphoric acid, water and optionally one or more multivalent cation(s) selected from Groups 2, 3, 4, 5, 6, 7, 8, 9, 10, 11, 12, 13, 14, 15 or 16 of the periodic table such as an alkaline earth salt, water and optional processing aids. An inorganic matrix composite can be prepared by applying a slurry of the modified aqueous alkali silicate composition to a reinforcing medium and curing the composite at a temperature from about 15° C. up to 1000° C. and a pressure of up to 20,000 psi for typical high-performance organic polymer processing (temperatures about 15° C. to about 200° C. and pressures <200 psi). The composite can be shaped by compression molding as well as other known fabrication methods.

16 Claims, No Drawings

INORGANIC MATRIX COMPOSITIONS, COMPOSITES AND PROCESS OF MAKING THE SAME

CROSS-REFERENCE

This is a division of application Ser. No. 09/871,765, filed on Jun. 1, 2001, of Mazany et al., for INORGANIC MATRIX COMPOSITIONS, COMPOSITES & PROCESS OF MAKING THE SAME.

CROSS-REFERENCE TO RELATED APPLICATIONS

This application claims the benefit of the filing of U.S. Provisional Patent Application Ser. No. 60/233,952, entitled "Inorganic Matrix Compositions, Composites and Process of Making the Same", filed on Sep. 20, 2000, and the specification thereof is incorporated herein by reference.

BACKGROUND OF THE INVENTION

The present invention relates to inorganic matrix compositions, which incorporate a silicate network and which can be processed at conditions comparable to those used for high-performance organic polymer processing, i.e., temperatures of about 15° C. to about 200° C. and pressures of less than about 200 psi, although a wide range of temperatures and pressures can be employed. The physical and thermal properties of the inorganic matrix binder, as well as composites, may be enhanced by elevated processing temperatures (up to 400° C. and greater) and pressures (up to 20,000 psi and greater) to produce exceptional neat resin and composite components. The composite materials formed at the lower processing conditions exhibit excellent thermal, dimensional, physical and flameproof properties.

The basic concept of composite materials has been known for centuries. Composite materials offer a unique blend of value added features, such as weight savings, electrical insulation, thermal insulation, corrosion resistance, and manufacturing cost savings. These features in some instances can overshadow the material cost in specialized applications ranging, for example, from sporting equipment to the F-22 aircraft fuselage. However, current state-of-the-art composite materials can also exhibit properties that present serious barriers to entry in some high-performance markets. These include poor flame, smoke and toxicity (FST) performance, physical degradation at high temperatures as well as higher material and processing costs. When exposed to fire or high temperatures (>500° C.), conventional composite materials can combust and generate toxic smoke and/or gases. The exceptions, such as ceramic matrix composites and metal matrix composites, are too expensive (often more than $500/lb) to gain a significant market presence. Clearly, a market need exists for affordable high temperature-resistant, insulating structures which have potential applications that minimize fire and heat transfer damage to sensitive areas, aircraft carrier blast or heat shields, high-temperature (600° C.) thermal insulation for wiring or other sensitive components susceptible to thermal damage, piston insulators, high temperature insulating structures, and fire barriers.

The most familiar composite systems today are based on organic polymer matrices such as epoxy/glass fiber, epoxy/carbon fiber, polyurethane/glass fiber, PVC/glass fiber, polyimide/quartz fiber, polyester/glass fiber and nylon/glass fiber. The flammability of organic polymer-based composites can be reduced by the addition of inorganic components and/or additives. The substitution of hydrogen atoms with halogen atoms (e.g. chlorine) in hydrocarbons and hydrocarbon polymers can significantly reduce flammability and smoke/gas generation but will degrade at high temperatures (>250° C.) and eventually incinerate at higher temperatures (>450° C.). Organic thermoplastic polymers also deform at relatively low temperatures (about 100° C.–300° C.) and organic polymers designed for higher service temperatures are generally prohibitive in material and processing costs.

Other composite materials include metal matrix composites (MMC), ceramic matrix composites (CMC), carbon-carbon composites as well as other inorganic matrix composites. A composite matrix may be 100% inorganic, or it may contain some organic content. Inorganic matrix networks include ceramics, silicates, glasses, aluminum silicates, alkali aluminum silicates, potassium silicates, sodium silicates, silicon carbides, silicon nitrides, alumina, cementitious materials, metals, metal alloys or other matrix materials known to those knowledgeable in the arts. Other materials that can be considered include inorganic particles encapsulated with inorganic binders, organic resins filled with inorganic fillers, inorganic-organic hybrids such as silicone, and other inorganic matrix materials known to those knowledgeable in the arts.

A disadvantage of organic polymers is their deficiencies at high temperatures. The use of metals and ceramics raises additional questions with regard to thermal and electrical conductivity, weight limitations, toughness, dielectric properties, ductility, and processing options. Further, ceramics do not lend themselves to the low temperature processing procedures as contrasted with organic polymer processing.

Alkali silicates are employed as affordable inorganic matrix binder materials. See for example, U.S. Pat. Nos. 4,472,199; 4,509,985; 4,888,311; 5,288,321; 5,352,427; 5,539,140; or 5,798,307 to Davidovits; U.S. Pat. No. 4,936,939 to Woolum; or U.S. Pat. No. 4,284,664 to Rauch. However, alkali silicates possess a high pH, which can frequently damage glass fibers by both chemical and physical means, severely degrading its strength. Furthermore, the cured composites taught by these patents still exhibit a high pH in a solid form, which continues to promote glass fiber degradation. So, the physical performance of a fiberglass/alkali silicate composite usually is extremely poor. This has been compensated by reinforcing the alkali silicate matrix with carbon fiber reinforcements rather than fiberglass. This replacement suffers in comparison to a composite prepared with fiberglass reinforcement in several respects such as material cost since carbon fibers are several times more expensive than glass fibers. Carbon fibers are also electrically and thermally conductive, which eliminates many important dielectric and thermal insulating applications and carbon fibers severely oxidize at 450° C., which eliminates many important high temperature applications. Also, when carbon fibers are combined with the alkali silicate matrix they have two different thermal expansion coefficients, which can lead to microcracking during thermal cycling.

Furthermore, cured alkali silicates (including alkali aluminum silicates) are also caustic when exposed to moisture, yielding a caustic solution, which is undesirable. Caustic by-products may accelerate corrosion in adjacent materials, in many applications, and the extreme caustic nature of the cured material suggests hydrolytic instability. Improved inorganic matrix materials that are less caustic may enable a much broader range of applications.

Thus, a need exists for noncombustible, temperature-resistant inorganic polymer compounds which process at temperatures and pressures typical for organic composites (<200° C. and <200 psi) in combination with the desirable features of ceramics (non-flammability and resistance to temperatures >450° C.) and complex shapes achievable with organic polymers.

SUMMARY OF THE INVENTION

The present invention is the result of the discovery that an inorganic polymer network can be achieved using a composition that is a modified alkali silicate. The modified alkali silicate network of the present invention can be prepared either (1) As the reaction product of an alkali silicate, an acidic network former (an acidic oxoanionic compound such as phosphoric acid), water and optionally a clay filler, and one or more network modifiers (a multivalent cation(s) selected from Groups 2, 3, 4, 5, 6, 7, 8, 9, 10, 11, 12, 13, 14, 15 or 16 such as an alkaline earth salt) or (2) as the reaction product of an alkali hydroxide or oxide, a silica source and water as well as the acidic network formers and network modifiers, or using combinations of these. The ability to vary these "building blocks" enables one to tailor product properties to suit numerous high-temperature applications. The composition can incorporate other network forming materials, modifiers and fillers.

Alkali silicate based composites can be prepared by applying an aqueous slurry of the modified alkali silicate matrix precursor to a reinforcing medium, such as a continuous or discontinuous glass, carbon, steel or other fiber mat. After an optional B-staging period the composite is cured within a temperature range of about 15° C. to about 1000° C. and higher, and at a pressure sufficient to consolidate the composite, usually at an external pressure range from ambient to about 20,000 psi and under a vacuum of about ambient to about $10^{-3}$ torr (e.g., vacuum bagging). The preferred range for the temperature is between 50° C. to 200° C. and at a pressure of less than 200 psi with or without vacuum bagging. The term "B-staging" is a common term used in composite technology to describe the practice of allowing a polymer matrix precursor to react and proceed to a partially polymerized intermediate stage short of a fully cured polymer network. Vacuum bagging can also be implemented to aid water removal and consolidation. Compression molding, as well as other typical molding methods, can be used to shape the composite as desired.

The resulting neat resin and/or composite exhibits dimensional stability up to about 1000° C. and higher, depending upon the formulation and processing and possesses excellent properties with respect to flame, smoke and toxicity. A composite made using the inorganic polymer network forming composition of the present invention is lightweight with good thermal and electrical insulating characteristics. Various shapes are relatively inexpensive to manufacture primarily due to the low temperature and pressures needed to effect cure of the composite.

Inorganic matrix compositions of the present invention are useful as fire retardant binders, bulk molding materials, sheet molding compositions, adhesives, coatings, neat resin compositions, cellular materials, such as foamed compositions or composite materials. As bulk materials, they are used to form shaped objects which when cured provide a structural material. As a composite material, the matrix composition is used to impregnate a fabric, which may be combined with other similarly impregnated fabrics to form a lay-up, which in turn is then shaped and cured to form a shaped composite or object, similar to a bulk material, but with the benefit of the reinforcement provided by the fabric.

The compositions of the present invention are useful in those applications where good thermal and physical stability are desired, such as those applications for which ceramic composites are used.

DETAILED DESCRIPTION OF THE INVENTION

The inorganic polymer network of the present invention is prepared by reacting an alkali silicate solution, an acidic oxoanionic compound such as phosphoric acid, water, and optionally, one or more multivalent cation(s) selected from Groups 2, 3, 4, 5, 6, 7, 8, 9. 10, 11, 12, 13, 14, 15 or 16 of the Periodic Table such an alkaline earth salt and optionally a clay filler. Alternately, the reaction of a silica source, an alkali base, water, an acidic oxoanionic network former, and optionally, one or more cationic network modifier(s) and/or a clay filler, can yield a high-temperature inorganic polymer network. Additional components such as fillers, other network forming materials and modifiers can be incorporated as needed. These include traditional fillers such as kaolin, metakaolin, montmorillonites, mica and other clay or mineral fillers. Modifiers can include crosslinkers and gel inhibitors/promoters such as mineral acids, organic acids and bases. The modified alkali silicate composition that is obtained can be cured at relatively low temperatures (<200° C.), and at low pressures (<200 psi) to produce a inorganic polymer network having dimensional and thermal stability to 1000° C. and higher. That is, a structure incorporating the matrix composition of the present invention exhibits no substantial permanent dimensional change (i.e., less than one percent) at temperatures to 700° C. and higher. However, it is not restricted to the lower temperature or pressure, and if needed, or desired, properties can be further enhanced utilizing elevated processing temperatures (up to 1000° C. and higher) and pressures (up to 20,000+ psi), and/or incorporating post-cure heat treatments.

The alkali silicates utilized can include a wide range of silica/alkali oxide ($SiO_2/A_2O$) ratios and % solids levels. Such solutions can be purchased from commercial sources or prepared immediately prior to use from precursors such as a silica source and an alkali hydroxide, alkali oxide, carbonate or combination thereof. The alkali silicate can be derived from an alkali base, such as potassium hydroxide or sodium hydroxide, from potash or soda ash and a silica source. The $SiO_2$ source can be an amorphous or crystalline $SiO_2$ form, such as silica, silica fume, precipitated silica, microsilica, sand, microcrystaline silica, silica gels, colloidal silica, quartz, quartz flour, a sodium silicate solution, a potassium silicate solution as well as solid sodium and/or potassium silicates.

The thermal and physical properties of the inorganic matrix binder can be influenced by the nature of the silica source, for example, the incorporation of a dense crystalline α-quartz network can enhance dimensional stability while, in turn, introducing an open, amorphous silica source will produce a lower density network. Also, some sources of silica fume contain traces of carbon that can lead to discoloration in the final product. When the alkali silicate is derived from an alkali hydroxide and a silica source, the alkali hydroxide is present in an amount of about 3 wt. % to about 25 wt. % based upon the weight of the total composition or mixture, preferably about 7 wt. % to about 15 wt. %. The silica source is present in an amount of about 10 wt. % to about 75 wt. % preferably 15 wt. % to 60 wt. %. The total mixture, in this instance, includes an alkali hydroxide, a silica source, phosphoric acid, an alkaline earth salt, a clay filler and water. In some cases, for example, when an alkali silicate solution is used, a portion of the alkali hydroxide, silica and water provided is included in the ranges disclosed. Furthermore, an appropriate alkali silicate solution can be achieved by a combination of various sources of alkali and/or silica.

The acidic oxoanionic compound can be boric acid, phosphoric acid, sulfric acid, nitric acid, sodium dihydrogen phosphate, disodium hydrogen phosphate, potassium hydrogen phosphate, ammonium hydrogen phosphate, metallic and/or nonmetallic phosphate salts or compounds incorporating borate, sulfate, aluminate, vanadate, germanate, and the like ions. The preferred acidic oxoanionic compound is phosphoric acid, $H_3PO_4$, which can be used in any grade or concentration although a more concentrated material is preferred to minimize the water content. The acidic oxoanionic compounds can be used in any combination or in addition to the phosphate compounds. The acidic oxoanionic compound is present in an amount of between about 0.01 wt. % and 20 wt. % based upon the total composition. The preferred amount of acidic oxoanionic compound is between about 2 wt. % to about 5 wt. %.

The multivalent cations which are used will be selected from Groups 2, 3, 4, 5, 6, 7, 8, 9, 10, 11, 12, 13, 14, 15 and 16, preferably from Groups 2, 3, 4, 5, 11, 12, 13, 14, 15 and 16 of the Periodic Table and are used in an amount of between zero and about 20 wt. % based upon the total mixture, with the ranges of about 1.0 wt. % to about 5 wt. % is preferred. Multivalent cations Cr, Mo, W, Mn, Fe, Co, Ni, Pd, and Pt of the Groups 6, 7, 8, 9, and 10, also can be used, but ones from the other groups are preferred. The multivalent cation containing compounds can comprise any main group metal salt including nitrates, sulfates and chlorides, although zinc chloride, $ZnCl_2$ is the preferred main group salt. Other compounds such as $Mg(NO_3)_2$ can be incorporated to modify network density. Other network modifiers can include compounds incorporating boron, aluminum, lead, gallium, cadmium, titanium, zirconium, lanthanum, cerium, neodymium, yttrium, calcium, strontium, barium, lithium, rubidium, cesium, and fluorine.

The clay filler is preferably calcined kaolin and is used in an amount from none to 25 wt. % based upon the weight of the total composition, with 3 wt. % to 5 wt. % being further preferred. The calcined kaolin may prove to be reactive with the silicate matrix material, although reactivity of the clay filler is not required and any of the commercially available clay fillers can be employed.

The starting chemical composition of the invention (excluding fillers), which is derived from the aqueous mixture or slurry, can be described by the following formula which is a qualitative representation of the starting materials:

$$(1-n)(aA_2O:SiO_2:bB:cC:dD_x).nH_2O$$

Where:
A=$(1-z)K_2O$ or $(z)Na_2O$, where z can be 0 or 1, $K_2O$ is potassium oxide, and $Na_2O$ is sodium oxide,
$SiO_2$ is silica, which can be derived from a silica source such as Kasil-1, silica fume, silica, silica gel or a combination thereof,
$H_2O$ is water,
a=molar ratio of $A_2O:SiO_2$, which ranges from 1.00 to 0.05,
b=molar ratio of $B:SiO_2$, which ranges from 0.500 to 0.001,
c=molar ratio of $C:SiO_2$, which ranges from 0.0 to 0.250,
d=is the molar ratio of $D:SiO_2$ and ranges from 0.0 to 2.000, n=molar ratio of $H_2O$ incorporated into the formulation, for which during initial formulation, the desired range is from 0.1 to 0.9, with n=0.2 to 0.4 being preferred; and after cure, n is less than 0.25, with n<0.1 being preferred, x=0 to about 20 and is the number of additives (D) used to aid in processing and performance of the basic formulation, B=additional network formers, such as phosphate, sulfate, borate groups, etc., derived from an acidic precursor, such as $H_3PO_4$, $H_2SO_4$, $H_3BO_3$, etc., or a combination thereof, C=secondary network linking units such as $Mg^{2+}$, $Zn^{2+}$, $Ti^{4+}$ derived from multivalent main group metal and/or transition metal compounds such as $Mg(NO_3)_2$, $ZnCl_2$, etc., or a combination thereof, and D=optional additives selected from one or more, alone or in combination, of
(i) reactive and/or nonreactive fillers such as kaolin, smectites, hormites, mica, vermiculite, metakaolin, metal oxides, etc. or a combination thereof;
(ii) gelation modifiers such as an organic base (quinoline) and/or an organic acid (lactic acid);
(iii) a surface-active agents such as an anionic, cationic and/or nonionic surfactant such as but not limited to alkylaryl sulfonates, quaternary ammonium salts, protonated organoamine salts, organic-inorganic hybrids such as silicones or combinations thereof; and
(iv) organic-based toughening and/or plasticizing agents.

The ability to vary these "building blocks" enables one to tailor product properties to suit numerous high-temperature applications. The composition can incorporate other network forming materials, modifiers and fillers.

Additional components such as fillers, other network forming materials and modifiers can be incorporated as needed. These include additives and fillers typically used or known to ones skilled in the art, whether inorganic, organic or hybrid, and can include additives or fillers to permit processing, fabrication and enhanced performance in service. Traditional fillers include kaolin, metakaolin, montmorillonites as well as other smectites and other clay or mineral fillers. Modifiers can include crosslinkers and gel inhibitors or promoters such as mineral acids, organic acids and bases. The modified alkali silicate composition that is obtained can be cured at relatively low temperatures (<200° C.), and at low pressures (<200 psi) to produce a inorganic polymer network having dimensional stability to 1000° C. and higher. However, it is not restricted to the lower temperature or pressure, and if needed, or desired, properties can be further enhanced utilizing elevated processing temperatures (up to 1000° C. and above) and pressures (up to 20,000+ psi), or performing post-cure heat treatments.

The optional network formers can be compounds such as borate, sulfate, aluminate, vanadate, boric acid, phosphoric acid, sulfuric acid, nitric acid, phosphorus pentoxide, sodium dihydrogen phosphate, disodium hydrogen phosphate, potassium hydrogen phosphate, ammonium hydrogen phosphate, other metallic and/or nonmetallic phosphate salts, germanate, or the like. The optional network former(s) are present in an amount of between 0.0 wt. % and 20 wt. % based upon the total composition. If included in the formulation, the preferred amount of the $F_1$ network former would be between about 2 wt. % to about 5 wt. %.

The optional secondary network linking unit(s) are preferably selected from Groups 2, 3, 4, 5, 11, 12, 13, 14, 15 and 16 of the Periodic Table can be used in an amount of between 0.0 wt. % and about 10 wt. % based upon the total mixture and if included in the formulation, the range of about 1 wt. % to about 3 wt. % would be further preferred. The secondary network-linking unit can be a multivalent cation useful for coordinating with oxo species such as the alkaline earths, main group metals, transition metal species, lanthanides and/or actinides and any useful combination thereof. Compounds such as $ZnCl_2$ can be incorporated to modify network density. Other network linkers can include multivalent cations derived from boron, aluminum, lead, gallium, cadmium, titanium, zirconium, lanthanum, cerium, neodymium, yttrium, magnesium, calcium, strontium and barium.

The optional additives that can be used include clay fillers, oxide fillers, gel modifiers, organic toughening agents, and/or plasticizing agents. When clay fillers are employed, calcined kaolin is preferred, and can be used in an amount from zero to 10 wt. % based upon the weight of the total composition, with 3 wt. % to 5 wt. % being preferred. The calcined kaolin may have some reactivity with the silicate matrix material, although reactivity of the clay filler is not required, and any of the commercially available clay fillers can be employed.

The optional oxide fillers that could be employed include magnesium oxide (MgO), which is preferred and which is used in an amount of zero % to 10% by weight based upon the total weight of the composition, with 1% to 6% by weight being preferred and 2% to 4% by weight being further preferred.

The optional gel modifier is an organic acid or base generally selected from the group consisting of hydroxyacids and N-based and P-based bases. Preferably α-hydroxyacids, β-hydroxyacids, substituted pyridines and quinolines are used. These are utilized in an amount from none to 10 wt. % based upon the weight of the total composition, with 0.05 wt. % to 5 wt. % being preferred.

The optional surface-active agent is an anionic, cationic and/or a nonionic surfactant such as but not limited to alkylaryl sulfonates, silicones, quaternary ammonium salts, protonated organoamine salts or combinations thereof. These are utilized in an amount from none to 10 wt. % based upon the weight of the total composition, with 0.5 wt. % to 5 wt. % being preferred.

The optional organic toughening agent and/or plasticizing agent is an organic-based toughening and/or plasticizing agent, or combinations thereof. These are utilized in an amount from none to 10 wt. % based upon the weight of the total composition.

The balance of the uncured composition is water and it will comprise about 10 wt. % to about 75 wt. % based upon the total composition weight. The range of 15 wt. % to 40 wt. % is preferred. The water can be introduced as part of one of the components, such as part of an alkali silicate solution, an alkaline earth salt solution or part of a phosphoric acid solution. Since the water incorporated in this invention can be viewed as a reaction medium, a reactant as well as a reaction product, the concentration of water can be difficult to quantify in general. The initial level of water in the starting mixture can vary from about 10 wt. % to about 70 wt. % while a B-staged prepreg may contain about 5 wt. % to about 35 wt. % water. A cured sample of the inorganic binder and/or composite can contain about 0 wt. % to about 10 wt. % water depending upon the processing conditions.

The reinforcing medium can be a material composed of reinforcing fibers, such as continuous or discontinuous fibers, which will be encapsulated in the matrix material. Reinforcing fibers may include glass fibers, carbon fibers, graphite fibers, mineral fibers, metallic fibers, quartz fibers, ceramic fibers, silicon carbide fibers, stainless steel fibers, titanium fibers, nickel alloy fibers, polymeric fibers, aramid fibers, basalt fibers, alkaline resistant glass fibers and/or other fibers known to those knowledgeable in the arts. Reinforcing fibers may be in many forms, including yarns, tows, whiskers, continuous fibers, short fibers, woven fabrics, knitted fabrics, non-woven fabrics, random mats, felts, braided fabrics, wound tows, and/or other forms known to those knowledgeable in the arts.

The matrix compositions may incorporate a wide variety of organic and inorganic fillers commonly used by those knowledgeable in the art. The matrix may incorporate filler materials such as ceramic powders, mineral powders, silicon carbides, silicon nitrides, silicates, aluminum silicates, sodium aluminum silicates, potassium aluminum silicates, carbon, carbon black, molybdenum and its compounds, or other fillers known to those knowledgeable in the arts. Organic materials are less preferred where the application is such that the organic materials will combust and produce gases. The filler materials also could be spheres such as microspheres, macrospheres, hollow and/or solid spheres, and/or cylindrical, flat and/or irregular or nonirregular shaped particles.

The matrix composite material system of the present invention influences the pH of the solution containing the alkali silicate backbone by incorporating an acidic inorganic component (such as a protonated oxoanions such as phosphoric or boric acid) and acidic salt modifier such as an alkaline earth salt. The alkali silicate solutions require a high pH to maintain a high concentration of monomeric silicate anions needed to moderate network formation. The ability to cure under moderate conditions after reducing the pH to a lesser value reduces the damage to the glass fiber reinforcement induced by the alkalinity of the matrix. The inorganic matrix binder cures via a condensation reaction partially driven by the elimination of water from the framework and excessive water in the binder leads to a lack of dimensional stability, poor physical properties and difficulty in processing.

The composite material can be prepared using any of the composite molding methods typically employed, the test specimen for this example was formed into cross-ply multilayer composite by a traditional prepreg/layup method. A "prepreg" is formed by impregnating a reinforcing medium or reinforcement with the matrix binder to produce a binder coated fabric sheet. The next step is to layer the individual prepregs together to achieve the desired thickness and/or shape. Next, the "layup" is placed into a mold to compact or consolidate the prepregs and to form the composite shape. Optionally, the prepregs could be subjected to a B-staging period and/or vacuum bagging to reduce the water content. Finally, the composite is cured within a temperature range of about 15° C. to about 1000° C. and higher, and a pressure range from 0 psi to about 20,000 psi, preferably at a temperature between 50° C. to 200° C. and at a pressure less than about 200 psi.

As can be appreciated, the matrix composites of the present invention can be fabricated and processed using compression molding, bulk molding compound, sheet molding compound, powder and reinforcement, liquid and reinforcement, prepreg and sintering. Additional methods include pultrusion (an automated process capable of producing a constant cross-section product), wet lay-up (a simple manual process for rapid prototypes and affordable low performance products), filament winding (an automated process for bodies of revolution), vacuum bag processing (a typical process for high performance aerospace laminates), autoclave or non-autoclave, vacuum infusion (a process for large thick high-performance parts), liquid resin, film infusion or powder infusion, resin transfer molding (a near net-shape molding process with excellent dimensional repeatability), extrusion (a process capable of producing constant cross-section non-structural short-fiber products), injection molding (an automated process capable of producing small non-structural short-fiber products), casting (a process for bulk non-structural products), spin casting (a process capable of producing high-quality tubing), trapped elastomer molding (a process capable of producing unusual shapes), and like processes.

These processes have several advantages compared to the curing/consolidation methods normally used in making high temperature inorganic polymers, namely ceramics and glasses. Ceramic and glass processing typically requires high temperature processing equipment (above 1000° C.). The nature of the inorganic matrix formulation of the present invention allows composites to be processed with conventional equipment found in thousands of composites manufacturing facilities. These processes allow a more rapid throughput than typical ceramic processes and enables the easy manufacturing of larger parts than typical ceramic processes. The use of these processes allows high fiber volumes for structural integrity, which is superior to regular concrete processing.

Glass fiber reinforcement (including E-glass fibers, S-glass fibers, alkali resistant glass fibers, etc.) is the preferred reinforcing material and it allows several unique performance features. The composite materials using glass fiber reinforcement and the matrix binder of the present invention are affordable, non-combustible, thermally-stable [i.e., no measurable (<0.2%) permanent dimensional change after 48 hours of exposure at 700° C.] composite materials with insulating qualities and structural qualities that can be processed at lower temperatures using typical processing equipment. Normal processing can be at relatively low temperatures (<200° C.) and low pressure (<200 psi). A cross-ply glass fiber laminate can be produced with thermal insulating qualities (e.g., thermal conductivity of nominally 1.4 W/m-K), electrical insulating qualities (no detectable electrical conductivity when measured with a standard ohm meter) and modest mechanical performance (flexural modulus up to 8 Msi, flexural strength to 20+ ksi, and ultimate flexural strains up to 1.3%). This combination of properties should be enabling technology for many applications.

Ceramic fiber reinforcement (including silicon carbide fibers) is another preferred reinforcement, especially for high temperature applications above 700° C. Although expensive, ceramic fibers maintain structural integrity well above 1000° C. Carbon fiber reinforcement is a preferred reinforcement where electrical conductivity, thermal conductivity, high strength and/or impact resistance is desired.

The following material properties and standardized tests are used to evaluate the performance of composites prepared with the inorganic matrix binders of the present invention: hydrolytic stability; flexural strength (ASTM D790-99), flexural modulus (ASTM D790-99), ultimate flexural strain (ASTM D790-99), specific gravity (ASTM D792), thermal dimensional stability, thermal conductivity (modified ASTM C177), electrical conductivity; pH (of the resin solution, the neat resin and the composite structure) Differential Scanning Calorimetry (or DSC); combustibility, thermal conductivity (ASTM C177), electrical conductivity (ASTM D 257), voltage breakdown (ASTM D229), permittivity @ 1 MHz (ASTM D229), dissipation factor @ 1 MHz (ASTM D229), arc resistance (ASTM D229), Izod impact strength (lengthwise & crosswise) (ASTM D229), flammability (UL 94, ASTM E-1354), dielectric constant; temperature index (NEMA LI-6), tensile strength, modulus and ultimate strain (ASTM D 638), compression strength, modulus and ultimate strain (ASTM D 695), interlaminar shear strength (ASTM D3846), short beam shear strength (ASTM D2344) and compression after impact.

The formulations disclosed within the terms of the present invention may also comprise any additives and fillers commonly in usage with regular hydraulic binders. Furthermore, the use of the matrix binder is not solely limited to composites but can be used to form neat resin components, coatings and adhesives.

As can be appreciated, the present invention can be formulated to be non-combustible. This desirable safety feature differentiates the invention from most organic materials (such as plastics, wood, rubber, etc.) that tend to combust, generate smoke and/or toxic gases upon exposure to fire. Further, the present invention can be formulated to be a thermal insulator and/or an electrical insulator. This desirable feature differentiates compositions in accordance with the present invention from most metals (such as steel, aluminum, copper, etc.), that tend to be thermal and electrical conductors.

The present invention can be formulated to perform at high temperatures (>1000° C.) with negligible permanent changes in dimensions. This desirable feature differentiates the invention from most organic materials (which tend to pyrolyze when exposed to temperatures above 500° C.), from most cement formulations (which tend to spall above 300° C.) and from many metals (including aluminum), that tend to warp or melt at 700° C. As a further feature, the present invention can achieve high temperature performance (above 1000° C.) while being processed at relatively low temperatures, (<200° C.) and low pressures (e.g. <200° C. and <200 psi). This feature is desirable because the ability to process at low temperatures and pressures allows the invention to be processed with more affordable equipment and manufacturing processes. This feature of the chemistry differentiates the present invention from most ceramics, glasses and metals, which generally require very high temperatures and/or high pressures to create a molded shape. (Of course, the invention also can be effectively processed at higher temperatures and pressures; we have processed the material above 10,000 psi and above 1500° C.).

In some instances, an application may require a thermal barrier to resist a flame and/or elevated temperatures for a single service cycle and then replaced or applications at reduced service temperatures which do not need to withstand extreme temperatures greater than 200° C. An organic-inorganic hybrid based on the present invention may be useful. The organic component may be monomeric, oligomeric or polymeric in nature and imparts additional toughness, plasticity and flexibility to the hybrid composition.

The present invention can be formulated to impregnate fibers to form a rigid composite material. This desirable feature differentiates the invention from most materials, because most rigid materials have not been processed as a low viscosity liquid capable of wetting fibers. Fiber reinforcement within a matrix material offer many benefits, including improved strength, stiffness, fracture toughness, fatigue, strength and impact resistance. While fiber-reinforced composite materials are common in applications ranging from automotive fascia to F-22 aircraft structures, the vast majority of composite materials are made with organic matrix materials, which are combustible. Noncombustible composite materials, such as ceramic matrix composite materials and metal matrix composite materials, tend to be cost prohibitive for most applications because of the high processing temperatures required. The present invention can be processed at much lower cost than most ceramic or metal matrix composite materials. These desirable features differentiate the present invention from many materials, including numerous metals.

The present invention readily can be formulated to incorporate a wide variety of fillers to tailor the material performance to suit the specific application. These fillers which may include hollow spheres, conductive fillers, friction and/or thermal additives, etc. can be incorporated to modify physical properties including density, conductivity, coefficient of friction, thermal performance, etc. These desirable features differentiate the present invention from many materials, including many metals. Given these features, the present invention is suited for many applications, including fire barriers, heat shields, high-temperature insulators, high-temperature molds, friction products, tooling and structures in high temperature environments.

Cellular materials, such as foamed compositions, can be formed from the present invention, which materials are nonflammable and useful for thermal management, fire protection and other high temperature applications. The capabilities of the present invention to withstand temperatures beyond 800° C. allows its use in applications that cannot be met by organic-based foamed materials and/or its derivatives. Inorganic cellular materials, such as foamed compositions, made from carbon, glass or ceramic materials can resist similar temperatures but are costly limiting their use for large scale thermal management needs and/or cost sensitive applications. Cellular materials prepared from the present invention can also be molded into complex as well as simple shapes as required and/or specifically shaped using traditional machining equipment. A cellular matrerials, such as foamed material can be either structural (integral) or nonstructural, formed with or without the use of a foaming agent. A syntactic foamed material can also be prepared utilizing the present invention and the appropriate fillers such as microspheres, microballoons and/or microcapsules.

The following examples are illustrative of the present invention, and should not limit the scope of the invention.

GENERAL EXAMPLE

The following example will serve to illustrate a matrix binder in accordance with the present invention (Ingredients shown in Table 1):

The alkali base, potassium hydroxide (KOH, 26.0 g) is dissolved in water (160.0 g) at room temperature with gentle stirring. An exotherm will occur and the mixture can be cooled as needed, such as refrigerating the mixture to approximately 5° C. to minimize any exothermic reaction with the silica fume. The silica fume (90.0 g) is then added to the KOH solution while being stirred with a high-shear mixer. The phosphoric acid solution (12.0 g 85% $H_3PO_4$ in 12.0 g water) is added dropwise to assure that the mixture does not gel. After this addition is completed, calcined kaolin, metakaolin or kaolin powder (15.0 g) is added with high-shear mixing. Finally, the magnesium nitrate solution (2.5 g $Mg(NO_3)_2 \cdot 6H_2O$ in 2.0 g water) is added, again with vigorous stirring for approximately an additional 10 minutes. The mixture is allowed to set until the viscosity rises to a level (approximately 150 centipoise) suitable for application to the reinforcement medium (fabric, chopped fiber, wound filament, etc.) needed to construct the composite. If a neat sample is required, the amount of water used can be reduced. The composite material can be prepared using any of the composite molding methods typically employed, the test specimen for this example was formed into a composite by a traditional prepreg/lay-up method. A "prepreg" is formed by impregnating a reinforcing medium or reinforcement with the matrix binder to produce a binder coated fabric sheet. The next step is to layer the individual prepregs together to achieve the desired thickness and/or shape. Next, the "lay-up" is placed into a mold to compact or consolidate the prepregs and to form the composite shape. Optionally, the prepregs could be subjected to a B-staging period and/or vacuum bagging to reduce the water content.

Fiberglass composite panels were made using the matrix binder of Example 1 and compression molded using standard composite processing parameters: curing at 200 psi and 80° C. for 3 hours, 110° C. for 3 hours and 150° C. for 3 hours. The fiberglass composite is electrically nonconductive (no detectable conductivity as measured with a standard ohmmeter) and has a thermal conductivity of 1.4 W/m-K, which is similar to plate glass. The cured resin is brittle but exhibits an ultimate flexural strain of 0.5%, as compared to ceramics which typically fail at 0.1% strain. The composite is able to carry a load after being struck with a hammer, while ceramics will shatter. Flame, smoke & toxicity (FST) performance was confirmed by exposure of 2 mm thick specimen to a 1,600° C. propane flame for 120 seconds during which the panel did not ignite nor produce smoke or fumes. The silicate network is designed for thermal stability and it exhibits no significant permanent dimensional change (<0.2%) after 48 hours of exposure to 700° C.

Examples 1–7

Modified alkali silicate compositions were made in accordance with the process set forth in the General Example, but the ingredients were varied as shown in Table 1.

TABLE 1

Matrix Formulations in Examples 1–7.

| Ingredients | | Example 1 (g) | Example 2 (g) | Example 3 (g) | Example 4 (g) | Example 5 (g) | Example 6 (g) | Example 7 (g) |
|---|---|---|---|---|---|---|---|---|
| $H_2O$ | | 160.0 | 72.40 | 98.3 | 693.3 | — | — | — |
| KOH | | 26.0 | 70.50 | 70.5 | 649.0 | 138.4 | 138.4 | 138.4 |
| Silica | Kasil-1* | — | — | — | — | 244.4 | 244.4 | 244.4 |
| Source | Silica fume | 90.0 | 206.30 | 206.3 | — | — | 423.7 | 423.7 |
| | Silica gel | — | — | — | 379.6 | — | — | — |
| | Quartz flour | — | — | — | 1518.4 | 423.7 | — | — |

TABLE 1-continued

Matrix Formulations in Examples 1–7.

| Ingredients | | Example 1 (g) | Example 2 (g) | Example 3 (g) | Example 4 (g) | Example 5 (g) | Example 6 (g) | Example 7 (g) |
|---|---|---|---|---|---|---|---|---|
| Acidic Oxoanionic Compound | $H_3PO_4$ | 12.0 | 22.90 | — | 211.0 | 52.75 | 52.75 | 52.75 |
| | $H_2O$ | 12.0 | 22.90 | — | 211.0 | 52.75 | 52.75 | 52.75 |
| Filler | Kaolin | 15.0 | 34.40 | 34.4 | 316.0 | 79.00 | 79.00 | 79.00 |
| Multivalent Cation(s) Compound | $ZnCl_2$ | — | — | — | — | — | 7.00 | 7.00 |
| | $Mg(NO_3)_2 \cdot 6 H_2O$ | 2.5 | 11.45 | — | 105.0 | 26.25 | — | — |
| | $H_2O$ | 2.0 | 5.75 | — | 53.0 | 13.25 | 4.00 | 4.00 |
| Surfactant | Silicone copolymer | — | — | — | — | — | — | 10.00 |

**Kasil-1 (Potassium silicate solution, 2.50 $SiO_2$:$K_2O$, PQ Corporation, Valley Forge, PA.)

Example 8

The aqueous slurry composition of Examples 2 and 3, each having a viscosity of about 150 centipoise, were used to impregnate, using a laboratory scale treater, an E-glass fabric 7781, which was taken from a 10 inch wide roll of fabric. The roll was cut into sheets and staged at room temperature for 30 minutes. Ten sheets of fabric, which were similarly prepared, were layered on a release-coated surface to give a composite that was approximately 0.110 inch thick. This was done with the composition of Example 2 and then repeated with the composition of Example 3 so two different composites were formed. Each composite panel was inserted into a vacuum bag and placed under vacuum of 28.5 inches of mercury for 2 hours. The vacuum bagged panels were then inserted into a press between two plates and cured at 80° C. for 3 hours under 200 psi pressure and 28.5 inches of mercury of vacuum. The pressed panels were removed from the press and post baked at 80° C. for 12 hours, 110° C. for 12 hours, and 150° C. for 4 hours. The results are reported in Table 3.

TABLE 3

Mechanical Strengths of Composites cured in Examples 8, 11, 12, 13, 15 and 15.

| Example | Formulation | Flexural Strength | Flexural Modulus |
|---|---|---|---|
| 8 | 2 | 11.4 | 5.4 |
| 8 | 3 | 9.2 | 3.6 |
| 11 | 4 | 12.6 | 4.3 |
| 11 | 4 (72-hr water boil) | 7.3 | 4.2 |
| 12 | 5 | 9.1 | 3.0 |
| 13 | 2 | 12.4 | 4.2 |
| 15 | 6 | 21.2 | 3.7 |
| 16 | 7 | 19.1 | 3.2 |
| | | ksi | Msi |

As can be seen, the panels made using the inorganic matrix composition in accordance with the present invention significantly outperformed (23% higher strength) the panel made without the acidic oxoanionic compound or the multivalent cationic compounds in the compositions in accordance with the present invention.

Example 9

Using the aqueous slurry composition of Example 2 and the process of Example 7, a composite was made from 30 plies of impregnated woven S-2 glass fabric. The composite was cured in a press at 180° C. and 200 psi pressure. After removing the material from the mold, the cured composite panel was post-baked at gradually increasing temperatures up to 400° C. The post-baked panel was machined into a disk, and inserted into cylinder to perform as an insulator within an aircraft braking system. The brake system was tested on a dynamometer to simulate an aborted takeoff, which placed extreme thermal shock on the entire system, including the insulator, which went from ambient temperature to 600° C. within 3 seconds. The brake insulator made using the matrix material of the present invention passed without notable damage. The performance exceeded ceramic plates and organic composite materials, which were severely damaged during the test.

Example 10

The aqueous slurry composition of Example 2 was applied through squeeze rollers to a woven S-2 glass fabric. The impregnated fabric was placed between two layers of plastic film and rolled onto a tube. This roll of impregnated fabric was sealed and refrigerated to minimize drying. Approximately 24 hours later, a sheet of pre-impregnated fabric was removed from the roll, cut into a gasket shape, and placed between two pipe flanges which were subsequently bolted together to apply pressure to the impregnated fabric. The bolted joint was then gradually heated to cure the gasket. The reinforced matrix composition in accordance with the present invention functioned as a high-temperature insulating gasket. It was flexible during the initial mounting, effectively adapting to minor mismatches in the two flanges. If insulating washers are used, the two flanges are thermally isolated from each other. Further, the gasket could be made using non-woven fabrics and could be pre-cured rather than in situ cured, per the present example.

Example 11

The aqueous slurry composition of Examples 4 was used to impregnate, using a laboratory scale treater, an S-2 glass fabric 6781, which was taken from a 10 inch wide roll of fabric. The composition had a high viscosity, approximately that of honey, but it was useable and would impregnate the fabric. The roll was cut into sheets and staged at room temperature for 30 minutes. Ten sheets of fabric, which were similarly prepared, were layered on a release-coated surface to give a composite that was approximately 0.110 inch thick. The composite panel was then inserted into a vacuum bag and placed under vacuum of 28.5 inches of mercury for 2 hours. The vacuum bagged panel was then inserted into a press between two plates and cured at 80° C. for 3 hours under 200 psi pressure and 28.5 inches of mercury of vacuum. The panel was removed from the press and post baked at 80° C. for 12 hours, 110° C. for 12 hours, and 150° C. for 4 hours. The panel was then demolded. One set of samples was tested in the as-molded condition. Another set of samples was placed in boiling water for 72 hours. The results are reported in Table 2. As can be seen from the results, strong panels can be made from alternative silica sources. The invention shows structural integrity after exposure to severe hot water conditions, even with a relatively low temperature cure.

Example 12

The aqueous slurry composition of Examples 5 was used to impregnate, using a laboratory scale treater, an S-2 glass fabric 6781, which was taken from a 10 inch wide roll of fabric. The composition had a viscosity of 1200 centipoise, and was effectively prepregged. The roll was cut into sheets and staged at room temperature for 30 minutes. Six sheets of fabric, which were similarly prepared, were layered on a release-coated surface. The composite panel was then inserted into a vacuum bag and placed under vacuum of 28.5 inches of mercury for 2 hours. The vacuum bagged panel was then inserted into a press between two plates and cured at 80° C. for 3 hours under 200 psi pressure and 28.5 inches of mercury of vacuum. The panel was removed from the press and post baked at 80° C. for 12 hours, 110° C. for 12 hours, and 150° C. for 4 hours. The panel was then demolded and tested. The results are reported in Table 2. As can be seen from the results, strong panels can be made from alternative silica sources.

Example 13

The aqueous slurry composition of Examples 2 was used to impregnate, using a laboratory scale treater, an S-2 glass fabric 6781, which was taken from a 10 inch wide roll of fabric. The composition had a viscosity of 150 centipoise, and was effectively prepregged. The roll was cut into sheets and staged at room temperature for 30 minutes. Six sheets of fabric, which were similarly prepared, were layered on a release-coated surface. The composite panel was then inserted into a vacuum bag and placed under vacuum of 28.5 inches of mercury for 2 hours. The vacuum bagged panel was then inserted into a press between two plates and cured at 80° C. for 3 hours under 200 psi pressure and 28.5 inches of mercury of vacuum. The panel was then demolded and tested. The results are reported in Table 2. As can be seen from the results, alternative cure cycles are viable.

Example 14

Using the aqueous slurry composition of Example 2 and the process of Example 7, several composite panels were made from 4 plies of impregnated woven S-2 glass fabric. The composite was cured in a press at 180° C. and 200 psi pressure. The composite panels formed an adhesive bond to several materials placed within the mold. These materials included steel, glass, plastic and PTFE. A cohesive failure mode was seen for both steel and glass when peeling the adhesive bond.

Example 15

The aqueous slurry composition of Examples 6 was used to impregnate, using a laboratory scale treater, an S-2 glass fabric 6781, which was taken from a 10 inch wide roll of fabric. The composition had a viscosity of 520 centipoise, and was effectively prepregged. The roll was cut into sheets and staged at room temperature for 30 minutes. Six sheets of fabric, which were similarly prepared, were layered on a release-coated surface. The composite panel was then inserted into a vacuum bag and placed under vacuum of 28.5 inches of mercury for 2 hours. The vacuum bagged panel was then inserted into a press between two plates and cured at 80° C. for 8 hours under 200 psi pressure and 28.5 inches of mercury of vacuum. The panel was then demolded and tested. The results are reported in Table 2 that illustrate the efficacy of selected multivalent cations for crosslinking other than an alkaline earth divalent cations such as Mg2+ and furthermore flexural strength and modulus are enhanced.

Example 16

The aqueous slurry composition of Examples 7 was used to impregnate, using a laboratory scale treater, an S-2 glass fabric 6781, which was taken from a 10 inch wide roll of fabric. The composition had a viscosity of 4000 centipoise, and was effectively prepregged. The roll was cut into sheets and staged at room temperature for 30 minutes. Six sheets of fabric, which were similarly prepared, were layered on a release-coated surface. The composite panel was then inserted into a vacuum bag and placed under vacuum of 28.5 inches of mercury for 2 hours. The vacuum bagged panel was then inserted into a press between two plates and cured at 80° C. for 8 hours under 200 psi pressure and 28.5 inches of mercury of vacuum. The panel was removed from the press and post baked at 80° C. for 12 hours, 110° C. for 4 hours, and 150° C. for 4 hours. The panel was then demolded and tested. The results are reported in Table 2. As can be seen from the results, physical properties such as flexural strength and modulus can be significantly improved through the use of surfactants and/or wetting agents.

This technology may be applied to a wide variety of applications such as reinforced missile silo doors, ship decks, aircraft carrier blast and heat shields, fire barriers, hot gas filters, protective coatings, electrical panels and boxes (with and without EMI shielding), engine covers, or any application that would need, advantageously, protection from fire and heat transfer damage, corrosion resistance, lifecycle cost savings and weight reduction. Another example would be reinforced insulator inserts for aircraft brakes. The insulator within each piston thermally isolates the friction head from the hydraulic system. Compared to conventional resins, which decompose below 450° C., the matrix binders of the present invention have much higher thermal stability (to above 1000° C.), and in contrast to metals, the composite of the present invention has superior insulation performance. This protects the hydraulic system and can reduce the weight and/or associated costs. In comparison to ceramics, the composite of the present invention is tougher because due to the presence of the reinforcing fibers, but less expensive than ceramic matrix composites due to the materials and processes utilized.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various

What we claim is:

1. A method of making an inorganic silicate composite comprising the steps of: applying an aqueous slurry of a mixture of an alkali silicate, an oxoanionic compound, a clay filler, an alkaline earth salt and water to a reinforcing medium and curing the composite by applying heat at a temperature of about 15° C. up to about 1000° C.+, an external pressure from ambient to about 20,000 psi, and optionally under a vacuum of about ambient to about $10^{-3}$ torr.

2. The method of claim 1, wherein the composite is cured at a temperature of about 15° C. up to about 200° C. and an external pressure from ambient to about 200 psi, and optionally under a vacuum of about ambient to about $10^{-3}$ torr.

3. The method of claim 1, wherein the uncured composite is in form of bulk molding compound, sheet molding compound, powder and reinforcement, liquid and reinforcement, or prepreg.

4. The method of claim 1, wherein the composite is cured using processes which include compression molding, pultrusion, wet lay-up, filament winding, autoclave vacuum bag processing, non-autoclave vacuum bag processing, vacuum infusion, liquid resin, film infusion or powder infusion, resin transfer molding, extrusion, injection molding, casting, spin casting, or trapped elastomer molding.

5. The method of claim 1, wherein the composite is consolidated before and/or during the curing process.

6. The method of claim 1, wherein the slurry includes additional filler materials of carbon fibers, glass fibers, alkali resistant fibers, mineral fibers, organic fibers, ceramic fibers or metallic fibers, or combinations thereof.

7. The method of claim 1, wherein the slurry includes additional filler materials of graphite fibers, E-glass fibers, S-glass fibers, stainless steel fibers, titanium fibers, nickel alloy fibers, aramid fibers, polyethylene fibers, basalt fibers, SiC fibers or BN fibers, or combinations thereof.

8. The method of claim 1, wherein the reinforcing medium is a glass fiber such as an E-glass fiber, S-glass fiber and/or an alkaline resistant fiber.

9. The method of claim 1, wherein the slurry further includes a surface-active agent.

10. The method of claim 1, wherein the slurry further includes an anionic, cationic or a nonionic surface-active agent, or combinations thereof.

11. The method of claim 1, wherein the slurry further includes a surface-active agent of an alkylaryl sulfonate, silicone, quaternary ammonium salt, protonated organoamine salt, or combinations thereof.

12. The method of claim 1, wherein the slurry further includes a surface-active agent in an amount from none to about 10 wt. % based upon the weight of the total composition.

13. The method of claim 1, wherein the slurry further includes a surface-active agent in an amount from 0.5 wt. % to about 5 wt. % based upon the weight of the total composition.

14. The method of claim 1, wherein said oxoanionic compound is phosphoric acid or a salt of phosphoric acid.

15. The method of claim 1, wherein the slurry includes filler materials comprising ceramic powder, mineral powder, silicon carbide, silicon nitride, silicate, aluminum silicate, sodium aluminum silicate, potassium aluminum silicate, carbon, carbon black, molybdenum, or a molybdenum containing compound.

16. A method of making an inorganic silicate composite comprising the steps of: applying an aqueous slurry of a mixture of an alkali silicate, phosphoric acid, water and optionally a clay filler, an alkaline earth salt and/or a gel modifier to a reinforcing medium and curing the composite by applying heat at a temperature of about 15° C. up to about 1000° C. and external pressures from ambient pressure to about 20,000 psi and/or under a vacuum of from about ambient to about $10^{-3}$ torr.

* * * * *